United States Patent [19]

Neumann et al.

[11] 4,360,749
[45] Nov. 23, 1982

[54] AUTOMOTIVE ALTERNATOR CONSTRUCTION

[75] Inventors: Karl-Heinz Neumann, Leonberg; Walter Hagenlocher, Stuttgart; Karl Kleebaur, Allmersbach; Klaus H. Christ, Stuttgart, all of Fed. Rep. of Germany

[73] Assignee: Robert Bosch GmbH, Stuttgart, Fed. Rep. of Germany

[21] Appl. No.: 170,281

[22] Filed: Jul. 18, 1980

[30] Foreign Application Priority Data

Aug. 18, 1979 [DE] Fed. Rep. of Germany ....... 2933568

[51] Int. Cl.³ ............................................ H02K 15/00
[52] U.S. Cl. ................................... 310/42; 310/68 D; 310/89
[58] Field of Search ................... 310/68 R, 68 D, 89, 310/168, 42, 50

[56] References Cited

U.S. PATENT DOCUMENTS 3,688,138  8/1972  Jacyno et al. ........................ 310/50
3,731,126  5/1973  Hagenlocher et al. ............... 310/68
4,028,568  6/1977  Tatsumi et al. ..................... 310/68 X
4,288,712  9/1981  Hagelocher et al. ........ 310/68 D X Primary Examiner—Donovan F. Duggan
Attorney, Agent, or Firm—Frishauf, Holtz, Goodman & Woodward

[57] ABSTRACT

To facilitate assembly of an automotive alternator, the alternator housing (11) is separated into two axially split half-shells (11a, 11b), the dividing line (11c) preferably passing through the axis of the shaft (18) of the alternator. The alternator assembly is made by providing a subassembly including the shaft, electromagnetic rotor structure, bearings, and a disk element in which rectifier diodes are seated and which can also support holders in engagement with the slip rings and the voltage regulator. The stator is slipped around the subassembly, a fan wheel and pulley can be attached to the subassembly which is then placed into one half-shell. The bearings and the concentric elements are positioned in alignment by seats formed in the half-shell, and the axial alignment can be accurately checked, and if the alignment is found proper, the second half-shell is assembled thereover.

12 Claims, 3 Drawing Figures

4,360,749

AUTOMOTIVE ALTERNATOR CONSTRUCTION

The present invention relates to an automotive-type alternator, and more particularly to a construction of such an alternator so that it can be easily assembled and, preferably, additionally is capable of making use of previously manufactured subassemblies.

BACKGROUND AND PRIOR ART

Automotive alternators usually have a housing which is divided in axial direction. The housing contains two end bells located at the axial facing ends of the alternator. One of these ends is the drive end, usually supplied with a pulley to be driven by a V-belt from the automotive engine with which the alternator is to be used. The other end bell may, additionally, function as a support and/or cooling element for a rectifier diode assembly, voltage regulators, and the like. The end bells or end disks of the alternator are connected by axially extending circumferentially positioned bolts, which also clamp the stator structure therebetween. The end bells retain the bearings for the shaft of the alternator.

It has previously been proposed to construct small electrical hand tools, such as hand drills and the like, by using housings made of plastic or die-cast metal in half-shell construction in which the housing shells are separated in a plane which is parallel to, and usually passes through the axis of the machine shaft. Such constructions are particularly used with small hand tools which are to be made inexpensively, may be subject to repair, and which have low requirements on reliability, operating power or efficiency, and are generally subjected only to intermittent use involving hardly any rise in operating temperature.

THE INVENTION

It is an object to improve the construction of automotive alternators, and particularly to improve the structure so that assembly thereof can be facilitated.

Briefly, the housing shells are not separated in axial direction as previously customary in connection with dynamo electric machines but, rather, the alternator is so constructed that the housing shells are fitted together along a plane parallel to, and preferably passing through, the axis of the alternator, with the respective half-shell having, additionally, holding brackets and attachment eyes secured thereto to permit attachment of the respective half-shells, when secured together, to structural support elements of the automotive vehicle in which the alternator is to be used.

The construction has the particular advantage with respect to prior art alternators that manufacturing is simplified. Further, the bearing which is adjacent the drive pulley can be fitted into the half-shell, and precisely positioned, which was difficult when fitting an end bell on the alternator shaft.

It has been found, surprisingly, that making alternators in half-shell construction, and forming the attachment brackets or eyes directly on the half-shells permits simplification of manufacture, and that the limitation of half-shell construction to small hand tools, such as ¼ inch electric drills and the like, can be overcome by suitable fitting of the half-shells. In a preferred form, the half-shells are separated by a break plane passing through the shaft axis of the alternator; this arrangement substantially simplifies a plurality of assembly steps in alternators. It permits preassembly of the alternator shaft, the rotor elements thereon, and the bearings, to form a subassembly, and fitting the subassembly in one of the half-shells. In accordance with a preferred feature of the invention, a ventilating or fan wheel can additionally be added to the subassembly, as well as the drive pulley at the drive side; and, further, slip rings for electrical connections can also be preassembled with the shaft. A second subassembly formed of rectifier diodes and associated heat sink elements can be made, the rectifier diodes and heat sink elements for example forming one of the bearing support elements.

The arrangement permits simplified assembly of the fan or ventilating wheel on the shaft adjacent the housing; this is a safety factor in automotive alternators which, additionally, contributes to the reliability of operation of the alternator as such, since dangerous handling of, as well as damage to, the wheel, with the exposed fan blades, is minimized when the fan wheel is preassembled on the rotor. The blades are frequently made of thin sheet metal, subject to damage by bending upon assembly. Associating the fan wheel with the subassembly already on the shaft and then assembling the complete subassembly into the half-shell prevents damage to the delicate vanes of the fan wheel.

DRAWINGS

Figure 1:
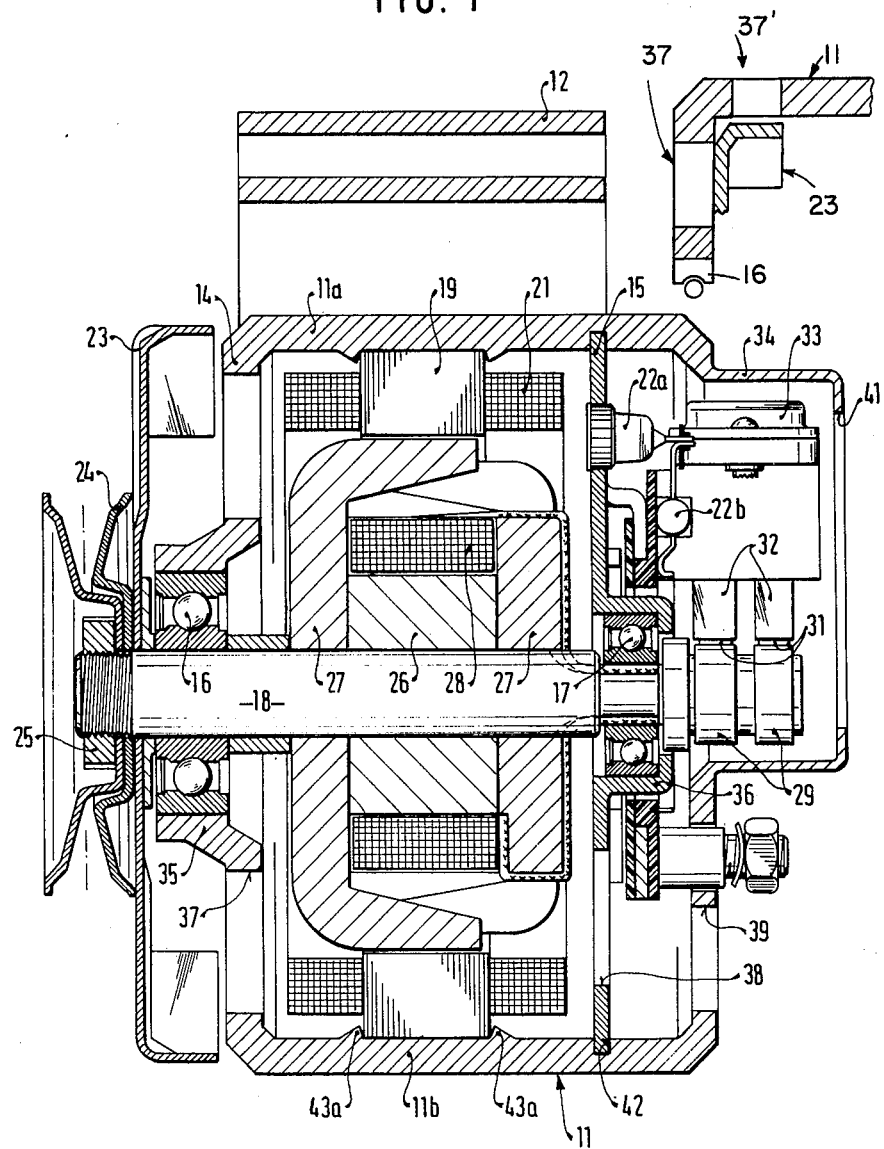
FIG. 1 is a longitudinal section through an automotive alternator of the interdigited or claw-pole type.
Figure 1A:
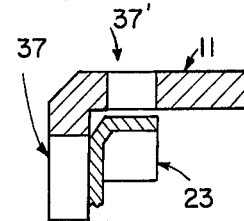

The alternator housing—see FIG. 1–has two axially divided half-shells 11a, 11b, split in the direction of the axis of the shaft 18. The two half-shells 11a, 11b, split along a horizontal division line 11c, together, form the housing 11 for the alternator. The half-shell 11a has a pivot bracket 12 formed integrally therewith (see FIG. 3); the housing half-shell 11b has a holding bracket 13 formed integrally therewith. The brackets 12, 13 are formed with terminal eyes for attachment to suitable mounting bolts on the engine of an automotive vehicle. The housing 11 includes a bearing holding portion 14 at the drive side of the alternator. The second bearing holding portion 15, simultaneously, forms a heat sink for a group of rectifier diodes 22a, and is secured as a separate element by seating in a groove of the respective bearing halves 11a, 11b. Bearings 16, 17 are secured in the respective portions 14, 15 to journal the shaft 18. A stator 19 with a stator winding 21 thereon is seated in the housing 11. The stator winding 21 is connected to a group of rectifier diodes, which includes power diodes 22a pressed into the portion 15 and forming a heat sink and heat dissipation surface therefor. Additional diodes 22b are provided, for example to supply power to the field coil 28 on the rotor. The drive side of the alternator has a fan wheel 23 secured thereto which is attached to the shaft 14 together with drive pulley 24 by a nut 25. The rotor shaft 18 carries a rotor with a pole core 26, interdigited claw poles 27, and the field winding 28. The terminal ends of the field winding 28 are connected to slip rings 29, also attached to the shaft 18, and forming a subassembly therewith. Brushes 31 bear against the slip rings 29. The brushes 31 are guided in a brush holder 32 which is attached to a voltage regulator 33. The electrical components of the alternator are protected against contamination by dirt and mechanical damage by a cover shield 34. Bearings 16, 17 are seated in bearing bushings 35, 36 which are portions of the respective end portions 14 of the housing 11 and of the cooling or heat dissipating disk 15 forming a part of the housing portion. Suitable openings 37, 38, 39, 41 formed in the portions 14, 15 and the cover cap or shield 34 provide for passage of air axially through the machine. The stator 19 is preferably secured in position in the housing 11 by projections 43 which are formed on the inside surface of the respective half-shells 11a, 11b (FIG. 1). Continuous ridges 43b (FIG. 2) may also be used.

Figure 2:
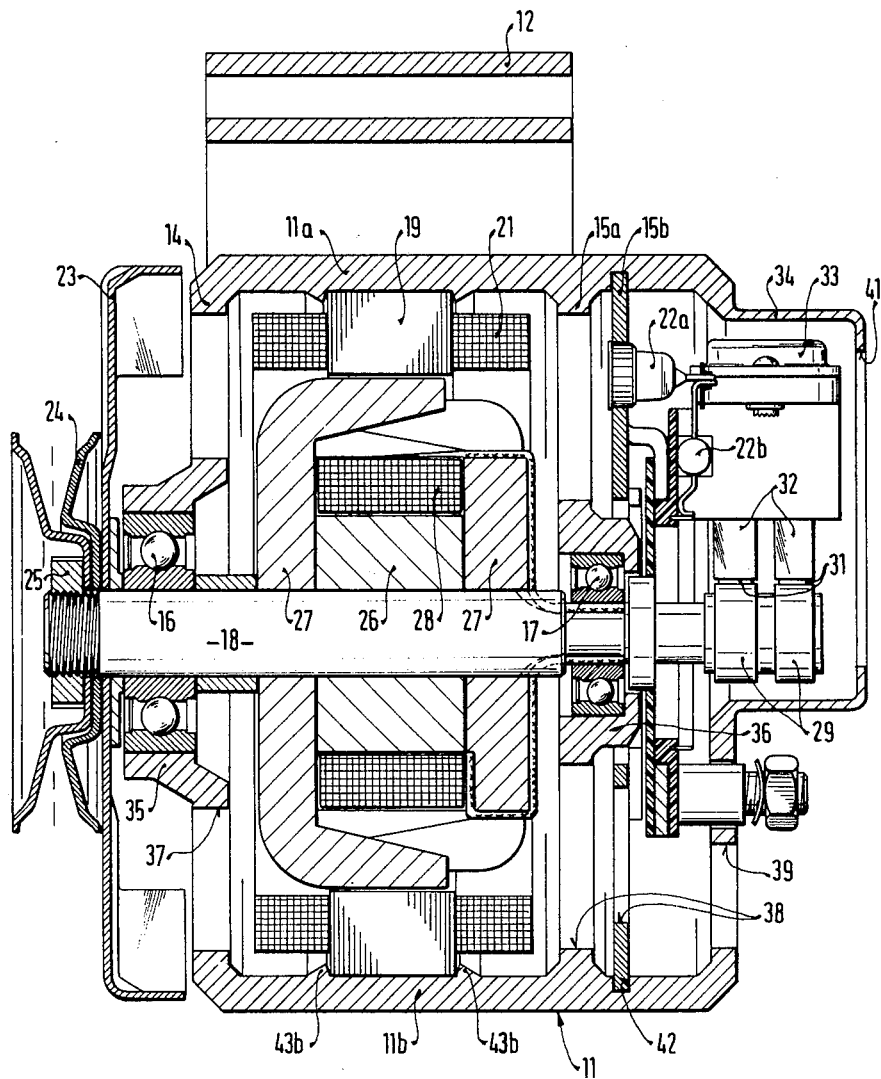
FIG. 2 is a view similar to FIG. 1 and illustrating another embodiment.

The embodiment of FIG. 2 is essentially similar to that of FIG. 1 and the same elements have been given the same reference numerals. Basically, the difference between the two embodiments is the location of the second bearing 17 which, similar to the first bearing 16, is located in a portion 15a of the housing half-shell itself; but the cooling dissipating plate or fin 15b is set into the housing 11 as a separate element. The cooling disk 11b, preferably a circular disk, is secured in the half shells 11a, 11b by being inserted into a groove 42 formed at the inner surface of the respective half-shell. The position of the bearing 17 is not critical; bearing 17 may be placed as shown or can be located outside of, or beyond, the slip rings 31, for example by extending the bent-over bracket portion 36 (FIG. 1) in axial direction or by extending the half-shells and locating the holding disk 15 or holding portion 15a close to the terminal end of the shaft and positioning the respective elements formed by the brush holders 32, the diode assembly 22a, etc., between the bearing holding portion and the rotor.

Figure 3:
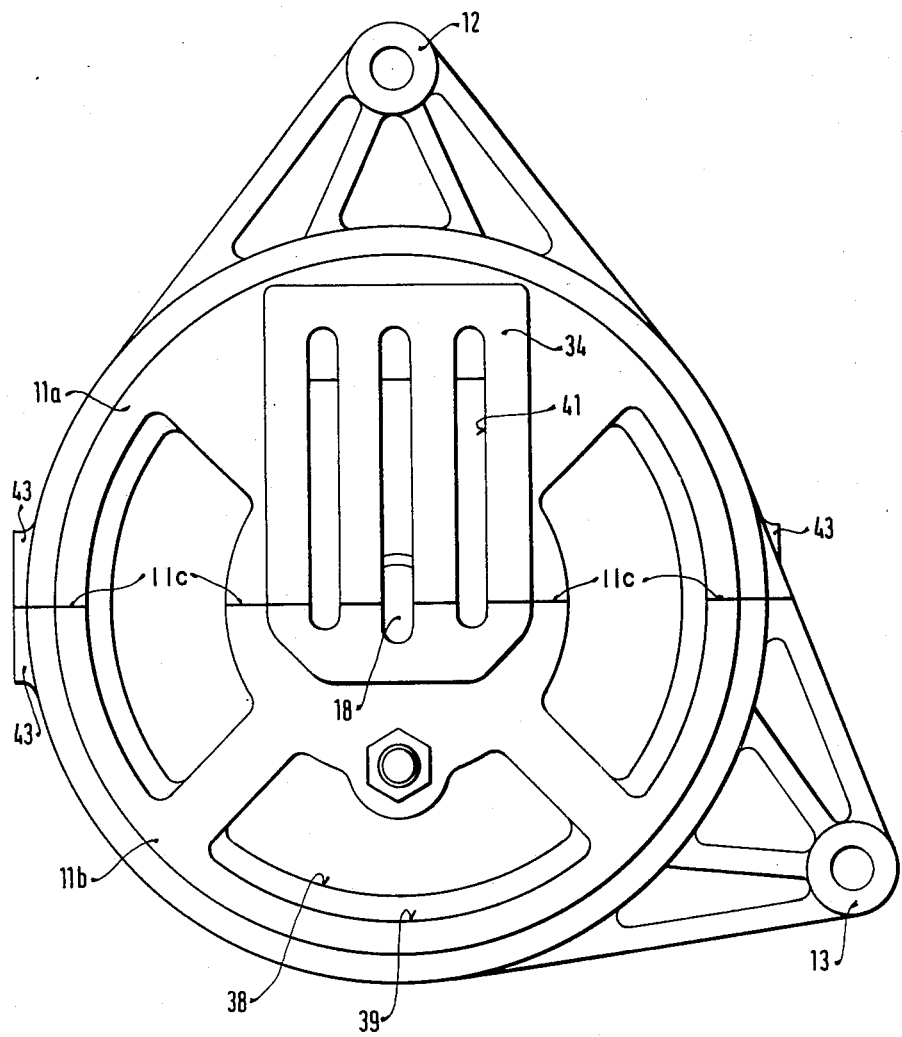
FIG. 3 is an end view of either one of the embodiments of FIG. 1 or 2, from the right side of the respective figure.

The end view of either one of the machines illustrated in FIG. 1 or 2, and looked at from the right side of the respective figure, is seen in FIG. 3. FIG. 3 shows the cover cap or shield 41. The horizontal half-break or half-division 11c of the respective shell-halves 11a, 11b is seen, as well as attachment brackets 43 which retain connecting screws to hold the shells together. FIG. 3 also shows the attachment of the respective brackets 12, 13 to the half-shells. Of course, the housing could be split along a different line, for example in such a manner that both the brackets 12, 13 are secured to one housing half-shell, and the other housing half-shell does not carry a bracket.

In accordance with another construction, the housing shell 21 can be axially extended to retain the fan wheel 23 therein. If this arrangement is desired, then the housing half-shells 11a, 11b should include suitably placed openings to permit air flow and ejection of air by the fan wheel.

In manufacture, it is desirable to make selective subassemblies which, then, are placed in one half-shell for subsequent attachment by the screws passing through the brackets 43 (FIG. 3). The subassembly, preferably, includes at least the shaft 18, the electromagnetic portions of the rotor 26, 27, 28, bearings 16, 17, and the slip rings 31, already connected to the respective terminal ends of the field 28. If desired, and to further facilitate manufacture and prevent damage to the fan wheel, the drive pulley 24 and fan wheel 25 can additionally be assembled on the shaft-bearing-rotor combination. The disk or portion 15 to which the rectifier 22a as well as the voltage regulator 33 and the brush holder 32 are attached likewise can be included in the subassembly. The cooling fin or cooling body for the rectifier 15, simultaneously, can act as a bearing support (FIG. 1) or can form a separate element (FIG. 2). The thus formed subassembly is then placed into a half-shell, with the disk 15 located in a circumferential groove 42 within the half-shells, the second half-shell assembled thereover, and screws passed through the bracket 43 (FIG. 3) to secure the half-shells together, and the alternator is finished. Axial assembly of parts with the consequent difficulty in alignment are thereby avoided. Preferably, more than one bracket 43 is provided on each side of the machine, spaced axially, for secure attachment of the half-shells.

Various changes and modifications may be made within the scope of the inventive concept.

We claim:

1. Automotive alternator adapted for attachment to an automotive engine
    a housing (11);
    means (12, 13) for securing the housing, and hence the alternator, to the engine;
    a stator (19, 21) seated in the housing;
    a rotor including a rotor shaft (18), an electromagnetic structure (26, 27, 28, 29), a drive pulley (24) and a sheet metal ventilating or fan wheel (23) secured to the shaft and rotatable concentrically within the stator;
    bearings (16, 17) seated in the housing and journaling the rotor,
    wherein
    the housing comprises a pair of essentially half-cylindrical half-shells (11a, 11b) which are separated along a separation plane which is parallel to the axis of the shaft (18);
    the separating plane passes through the axis of rotation of the shaft (18),
    means (35, 36, 42, 43a, 43b) formed inside of said half shells, forming the housing for locating said stator and said bearings in predetermined position in the respective half-shells;
    the securing means comprises at least one holding bracket attached to one of the half shells; and
    wherein
    the rotor shaft (18), bearings (16, 17), the drive pulley, the sheet-metal ventilating fan wheel and the electromagnetic structure (26-29) form a single subassembly fitted, with the stator surrounding the subassembly, within a half-shell for subsequent assembly of the other half-shell thereover.

2. Alternator according to claim 1, wherein both of the half-shells have a holding bracket, each, attached thereto.

3. Alternator according to claim 1, wherein the subassembly further includes a cooling plate (15), and rectifier elements (22a, 22b) secured to and supported by the cooling plate.

4. Alternator according to claim 3, wherein (FIG. 1) the cooling plate (15) forms a support plate for one of the bearings (17);
    and wherein the locating means formed in said housing comprises a groove (42) positioning said cooling plate and hence said bearing within the housing.

5. Alternator according to claim 4, wherein the electromagnetic structure comprises a field structure (26, 27, 28) and slip rings (29);
    and wherein the cooling plate (15) having said bearing (17) secured thereto, as well as said bearing, are positioned between the slip rings and the field structure.

6. Alternator according to claim 1, further including a rectifier assembly (22a, 22b) located within the housing (11);
   a cooling plate (15b) supporting said rectifier assembly;
   and a groove (42) formed in the half-shell within which said rectifier plate is fitted.

7. Alternator according to claim 1, wherein the locating means includes internally extending projections (43a, 43b) located adjacent the stator (19, 21) and positioning the stator within the half-shell.

8. Alternator according to claim 7, wherein the projections comprise internal, circumferentially extending ridges (43b) positioned adjacent the stator (19, 21) and positioning the stator within the respective half-shells (11a, 11b).

9. Alternator according to claim 1, wherein fan wheel (23) is located within the housing (11).

10. Alternator according to claim 1 wherein the fan wheel is located outside of the housing.

11. Alternator according to claim 1 wherein the holding bracket is integral with the housing.

12. Alternator according to claim 1 wherein both of the half shells each have an integral holding bracket formed thereon.

* * * * *